Patented Apr. 12, 1949

2,466,673

UNITED STATES PATENT OFFICE 2,466,673

METHOD FOR INCREASING FLOW OF WELLS

Daniel J. Mullady, Kevin, Mont.

No Drawing. Application May 22, 1946,
Serial No. 671,658

10 Claims. (Cl. 252—8.55)

My invention relates to the treatment of wells to increase the rate of fluid production therefrom and, while applicable to wells producing gas, brines, and other fluids, is of especial advantage in the treatment of wells for the production of oil.

My invention is concerned with improvements in such processes of treatment of wells producing oil and other fluids from sand, clay, or other silicious geological formations as utilize hydrofluoric acid either as such or mixtures of materials which, by their interaction, generate hydrofluoric acid within the well to effect a dissolution of a part of the geological formations. The use of hydrofluoric acid has heretofore been attempted and has been suggested, for example, by U. S. Patents Nos. 2,140,183 and 2,225,695. Such processes, however, have been characterized by various disadvantages with which those versed in the art are familiar. One particular disadvantage has been the failure of the hydrofluoric acid or compositions including hydrofluoric acid adequately to attack the geological formations in order to bring about satisfactory enhancement of the productivity of the well.

I have found that the action of hydrofluoric acid, in the treatment of wells, is markedly improved or enhanced or intensified if there is utilized, in conjunction therewith, one or more particular ammonium salts, namely, ammonium fluoride, ammonium bifluoride, ammonium nitrite, and ammonium nitrate. Of particular utility are ammonium nitrate and ammonium nitrite, especially ammonium nitrate, and their use, in conjunction with hydrofluoric acid, represents a particularly important, though limited, embodiment of my present invention. By the practice of my invention, not only is the fluid recovery from the formations materially increased but the formations are more readily and easily cleared and the over-all results are significantly improved.

The amounts of the hydrofluoric acid and the aforesaid ammonium salts utilized in any given case and the quantitative ratios of one to the other are subject to considerable variation depending, for example, upon the particular character of the geological formation involved and the extent of the increase or enhancement of the porosity sought to be obtained. The amount of hydrofluoric acid (considered in the form of commercial hydrofluoric acid which contains approximately 60% hydrofluoric acid) used may range from several hundred to several thousand pounds and there may likewise be a wide range in the amount of the aforesaid ammonium salts. A ratio of about 80 to about 120 gallons of 60% hydrofluoric acid to about 40 to about 100 pounds of the aforesaid ammonium salts is sufficient to serve for most situations. A particularly preferred embodiment comprises a ratio of about 100 gallons of 60% hydrofluoric acid to about 60 pounds of ammonium nitrate, the latter being used in the form of a strong, preferably substantially saturated, aqueous solution.

The time during which the mixture of the hydrofluoric acid and the aforesaid ammonium salts is allowed to remain in contact with the well formation is somewhat variable. In general, I prefer that the reaction between the reagents and the well formation be allowed to proceed until it reaches the end-point. In the usual case, this will be at the end of about 24 hours although, depending upon the exact character of the formation, this time may be appreciably shorter or longer.

The following examples are illustrative of the practice of my invention. It will be understood that various changes and modifications may be made which will be apparent to those versed in the art in the light of the teachings and guiding principles which are disclosed herein. Thus, for example, the total amounts of hydrofluoric acid and aforesaid ammonium salts and the proportions thereof to each other may be varied, wells other than oil wells may be treated, the technique of treatment modified, and other changes may be made without departing from the scope of my invention.

Example 1

A saturated aqueous solution containing 60 pounds of ammonium nitrate was poured into an oil well, the geological formation comprising a so-called sunburst sand. Five barrels of crude oil were then added, followed by 100 gallons of 60% hydrofluoric acid and then by sufficient crude oil to fill the well bore to the top. The well so treated was allowed to stand for about 24 hours and then pumped or swabbed.

Example 2

A saturated aqueous solution containing 60 pounds of ammonium nitrate and 20 pounds of ammonium fluoride (or ammonium bifluoride) was poured into an oil well of the type associated with a silicious geological formation. Five barrels of crude oil were then added, followed by 100 gallons of 60% hydrofluoric acid and then by sufficient crude oil to fill the well bore to the top. The well so treated was allowed to stand for about 24 hours and then pumped or swabbed.

Example 3

A mixture of 3 parts by weight of calcium fluoride and 1 part by weight of ammonium nitrate were suspended in an amount of drilling mud sufficient to hold said reagents in suspension in said mud. The resulting suspension was then used to cover the silicious formation of the oil well being treated and, by pressure, forced into said formation. Thereupon, concentrated sulfuric acid, in the proportion of about 4 parts by weight to 3 parts by weight of the mixture of calcium fluoride and ammonium nitrate, was added and pressure applied to force said acid into contact with the aforementioned reagents. Alternatively, the well may be filled to the top with crude oil. The well so treated was allowed to stand for 24 hours, was then bailed or swabbed until clean, and then pumped or swabbed.

As illustrative of the results obtained by the practice of the present invention, utilizing the procedure described in Example 1, the original production from a certain well was 0.75 barrel of oil per day. After the described treatment, the production rose to 5.36 barrels of oil per day.

It will be understood, in view of the foregoing disclosures, that the principles of the present invention may be utilized in conjunction with any well treatment procedures which involve the use of hydrofluoric acid either as such or formed in situ or in admixture with other reagents such as hydrochloric acid, sulfuric acid, ammonium fluorides, and the like. In this connection, for example, the utilization of the particular ammonium salts referred to above, in conjunction with hydrofluoric acid, may be effected in the manner heretofore described or by other acidizing procedures known to the art.

It will also be understood that the utilization of inhibitors, pursuant to known practice, to prevent or retard corrosion of metal piping and the like, is within the scope of the invention in conjunction with the improvements which I have described above.

While the invention has been described in detail, it is to be understood that the scope thereof is not to be limited other than is set forth in the claims.

What I claim as new and desire to protect by Letters Patent of the United States is:

1. In the process of treating wells to increase the rate of fluid production therefrom, the step which comprises introducing into said wells hydrofluoric acid and at least one ammonium salt selected from the group consisting of ammonium nitrite and ammonium nitrate, the hydrofluoric acid being present in amount greater than the amount of said ammonium salt, the amount of said ammonium salt being sufficient to enhance the action of the hydrofluoric acid on materials in the earth formation.

2. In the process of treating wells to increase the rate of fluid production therefrom, the step which comprises introducing into said wells hydrofluoric acid and at least one ammonium salt selected from the group consisting of ammonium nitrite and ammonium nitrate, said ingredients being present in a ratio of about 40 to about 100 pounds of the aforesaid ammonium salts to from about 80 to about 120 gallons of hydrofluoric acid calculated as 60% hydrofluoric acid.

3. In the process of acidizing oil wells of the type associated with silicious formations whereby to increase the production of oil therefrom, the step which comprises effecting the acidizing by means of hydrofluoric acid and at least one ammonium salt selected from the group consisting of ammonium nitrite and ammonium nitrate, the hydrofluoric acid being present in amount greater than the amount of said ammonium salt, the amount of said ammonium salt being sufficient to enhance the action of the hydrofluoric acid on materials in the earth formation.

4. In the process of acidizing oil wells of the type associated with silicious formations whereby to increase the production of oil therefrom, the step which comprises effecting the acidizing by means of hydrofluoric acid and at least one ammonium salt selected from the group consisting of ammonium nitrite and ammonium nitrate, said ingredients being present in a ratio of about 40 to about 100 pounds of the aforesaid ammonium salts to from about 80 to about 120 gallons of hydrofluoric acid calculated as 60% hydrofluoric acid.

5. In the process of acidizing oil wells of the type associated with silicious formations whereby to increase the production of oil therefrom, the step which comprises effecting the acidizing by means of hydrofluoric acid and ammonium nitrate, said reagents being employed in a ratio of about 100 gallons of 60% hydrofluoric acid to about 40 to 70 pounds of ammonium nitrate.

6. In the process of treating oil wells of the type associated with silicious formations to increase the rate of oil production therefrom, the steps which comprise pouring into the well a strong aqueous solution of at least one ammonium salt selected from the group consisting of ammonium nitrite and ammonium nitrate, then adding crude oil to the well, then adding hydrofluoric acid to the well, the hydrofluoric acid being utilized in an amount greater than the amount of said ammonium salt, the amount of said ammonium salt being sufficient to enhance the action of the hydrofluoric acid on silicious materials in the earth formation, allowing the well to remain in contact with the aforesaid materials for a substantial number of hours, and then removing said materials.

7. In the process of treating oil wells of the type associated with silicious formations to increase the rate of oil production therefrom, the steps which comprise pouring a substantially saturated solution of ammonium nitrate into the well, then adding crude oil to the well, then adding hydrofluoric acid to the well, the hydrofluoric acid being utilized in an amount greater than the amount of the ammonium nitrate, the amount of said ammonium nitrate being sufficient to enhance the action of the hydrofluoric acid on silicious materials in the earth formation, allowing the well to remain in contact with the aforesaid materials for not substantially less than 24 hours, and then removing said materials.

8. In the process of treating oil wells of the type associated with silicious formations to increase the rate of oil production therefrom, the steps which comprise admixing calcium fluoride and at least one ammonium salt selected from the group consisting of ammonium nitrite and ammonium nitrate, with a sufficient amount of a drilling mud to hold said salts in suspension in said mud, forcing said suspension into the well formation, adding strong sulfuric acid, allowing the well to remain in contact with the aforesaid materials for a substantial number of hours, and then removing said materials, the calcium fluoride being utilized in an amount greater than the amount of said ammonium salt and the sulfuric acid being utilized in proportions to convert said calcium fluoride to hydrofluoric acid, the amount of said ammonium salt being sufficient to enhance the action of the hydrofluoric acid on silicious materials in the earth formation.

9. In the process of treating oil wells of the type associated with silicious formations to increase the rate of oil production therefrom, the steps which comprise admixing approximately 3 parts by weight of calcium fluoride and 1 part by weight of ammonium nitrate with a sufficient amount of a drilling mud to hold said salts in suspension in said mud, forcing said suspension into the well formation, adding approximately 4 parts by weight of concentrated sulfuric acid, allowing the well to remain in contact with the aforesaid materials for not substantially less than 24 hours, and then removing said materials.

10. In the process of acidizing oil wells of the type associated with silicious formations whereby to increase the production of oil therefrom, the step which comprises effecting the acidizing by means of hydrofluoric acid and ammonium nitrate, said reagents being employed in a ratio of about 100 gallons of 60% hydrofluoric acid to about 40 to 70 pounds of ammonium nitrate, and allowing the well to remain in contact with the aforesaid materials for a minimum of about 24 hours.

DANIEL J. MULLADY.

REFERENCES CITED

The following references are of record in the file of this patent:

UNITED STATES PATENTS

| Number | Name | Date |
| --- | --- | --- |
| 1,990,969 | Wilson | Feb. 12, 1935 |
| 2,011,579 | Heath et al. | Aug. 20, 1935 |
| 2,094,479 | Vandergrift | Sept. 28, 1937 |
| 2,224,297 | Holmes | Dec. 10, 1940 |
| 2,425,415 | Bond | Aug. 12, 1947 |